United States Patent
Awada et al.

(10) Patent No.: US 11,815,351 B1
(45) Date of Patent: Nov. 14, 2023

(54) DEVICE FOR MONITORING INTERNAL PIPE DEPOSIT ACCUMULATION

(71) Applicant: KING FAISAL UNIVERSITY, Al-Ahsa (SA)

(72) Inventors: Chawki Awada, Al-Ahsa (SA); Sayeed Rushd, Al-Ahsa (SA); Nagih Shaalan, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/210,253

(22) Filed: Jun. 15, 2023

(51) Int. Cl.
G01N 27/22 (2006.01)
G01B 7/06 (2006.01)
G01N 17/00 (2006.01)

(52) U.S. Cl.
CPC ........... G01B 7/085 (2013.01); G01N 17/008 (2013.01); G01N 27/22 (2013.01)

(58) Field of Classification Search
CPC ........ G01B 7/085; G01B 7/06; G01N 17/008; G01N 27/22; G01N 27/221
USPC ......................................................... 324/671
See application file for complete search history.

(56) References Cited

U.S. PATENT DOCUMENTS 2,908,861 A * 10/1959 Gambrill ................ G01R 31/59
324/673
9,772,206 B2 9/2017 Wee et al.
9,778,017 B2 * 10/2017 Kim ...................... G01N 27/221
11,346,802 B2 * 5/2022 Gotz ..................... G01N 27/228
2009/0267619 A1 * 10/2009 Slezak ................. G01N 27/226
324/76.11

(Continued)

FOREIGN PATENT DOCUMENTS

CN 200968968 Y * 10/2007
DE 10049781 A1 * 4/2002 ............. G01F 1/584

(Continued)

OTHER PUBLICATIONS

T. Chen, N. Bowler and J. R. Bowler, "Analysis of Arc-Electrode Capacitive Sensors for Characterization of Dielectric Cylindrical Rods," in IEEE Transactions on Instrumentation and Measurement, vol. 61, No. 1, pp. 233-240, Jan. 2012, doi: 10.1109/TIM.2011.2157573 (Year: 2012).*

(Continued)

*Primary Examiner* — Tung X Nguyen
*Assistant Examiner* — Robert P Alejnikov, Jr.
(74) *Attorney, Agent, or Firm* — Nath, Goldberg & Meyer; Richard C. Litman (57) ABSTRACT

The device for monitoring internal pipe deposit accumulation is a capacitance-based sensor for monitoring changes in thickness of deposits accumulating on an internal surface of a pipe. The device includes a pipe segment having opposed first and second open ends with at least one valve releasably sealing at least one of the first and second open ends. A first electrode, in the form of an electrically conductive cylindrical shell, is mounted on and surrounds a portion of an external surface of the pipe segment. A second electrode, in the form of an electrically conductive rod, is mounted coaxially within an interior of the pipe segment. An electrical power source is electrically connected across the first and second electrodes to form a cylindrical capacitor and changes in capacitance of the cylindrical capacitor are monitored by a controller.

20 Claims, 5 Drawing Sheets

(56) References Cited

U.S. PATENT DOCUMENTS

| | | | | |
|---|---|---|---|---|
| 2014/0061064 A1* | 3/2014 | Tench | ............... | G01B 7/085 |
| | | | | 204/406 |
| 2021/0407770 A1* | 12/2021 | Moses | ............... | H01J 37/32082 |
| 2023/0168114 A1* | 6/2023 | Tschudin | ............... | G01F 23/26 |
| | | | | 73/861.12 |

FOREIGN PATENT DOCUMENTS

| | | | | |
|---|---|---|---|---|
| KR | 101221619 B1 | 1/2013 | | |
| RU | 2220392 C2 * | 12/2003 | ............ | C21B 13/026 |
| RU | 2333425 C2 * | 9/2008 | ............ | Y02W 30/20 |

OTHER PUBLICATIONS

Wang, Y., Han, Z., Gao, T. and Qing, X. (2018), "In-situ capacitive sensor for monitoring debris of lubricant oil", Industrial Lubrication and Tribology, vol. 70 No. 7, pp. 1310-1319, https://doi.org/10.1108/ILT-09-2017-0256 (Year: 2018).*

Rushd, M. M. A. "A capacitance sensor for pipeline flows of oil-water mixtures." Master of Science Thesis (2008).

Demori, Marco, et al. "A capacitive sensor system for the analysis of twophase flows of oil and conductive water." Sensors and Actuators A: Physical 163.1 (2010): 172-179.

Rushd, Sayeed, and R. Sean Sanders. "Application of a capacitance sensor for monitoring water lubricated pipeline flows." The Canadian Journal of Chemical Engineering 92.9 (2014): 1643-1650.

Wang, Yishou, et al. "In-situ capacitive sensor for monitoring debris of lubricant oil." Industrial Lubrication and Tribology 70.7 (2018): 1310-1319.

Wang, Yishou, et al. "A new in situ coaxial capacitive sensor network for debris monitoring of lubricating oil." Sensors 22.5 (2022): 1777.

Veisi, Aryan, et al. "Experimental Study of Void Fraction Measurement Using a Capacitance-Based Sensor and ANN in Two-Phase Annular Regimes for Different Fluids." Axioms 12.1 (2023): 66.

* cited by examiner

DEVICE FOR MONITORING INTERNAL PIPE DEPOSIT ACCUMULATION

BACKGROUND

Field of the Invention

The disclosure of the present patent application relates to the inspection and monitoring of pipelines, and particularly to a capacitance sensor for monitoring pipelines for the accumulation of deposits.

Description of Related Art

Regular inspection is required during the lifetime of a pipeline, particularly for the monitoring of unwanted deposit accumulation. In pipelines used in the oil and gas industries for transporting hydrocarbon-containing fluids, fouling on the interior of the pipeline is a common problem. Over time, various deposits, such as wax and asphaltene, accumulate, both decreasing the internal volume of the pipeline and also creating turbulent flow and other undesirable fluid dynamic effects. Inorganic deposits can also form, such as from the precipitation of salts (e.g., sulfates, sulfides, carbonates, silicates, and fluorides), a problem commonly referred to as "scaling". Since such deposits have a major effect on the operation of the pipeline, regular inspection and maintenance is required.

Various methods for inspecting deposit accumulation inside pipelines are used, including the insertion of inspection pigs, radioactive inspection techniques, electromagnetic velocity tomography, electromagnetic flowmeters, electrical induction sensing, and the like. Each of these techniques, however, requires the use of highly specialized equipment, which is susceptible to damage in the field, very expensive, and complicated to operate. Thus, a device for monitoring internal pipe deposit accumulation solving the aforementioned problems is desired.

SUMMARY

The device for monitoring internal pipe deposit accumulation is a capacitance-based sensor for monitoring changes in thickness of deposits accumulating on an internal surface of a pipe. The device for monitoring internal pipe deposit accumulation includes a pipe segment having opposed first and second open ends with at least one valve releasably sealing at least one of the first and second open ends. A first electrode, in the form of an electrically conductive cylindrical shell, is mounted on and surrounds a portion of an external surface of the pipe segment. A second electrode, in the form of an electrically conductive rod, is mounted within an interior of the pipe segment, such that the second electrode extends axially and is positioned coaxially with respect to the pipe segment. At least one mount may be secured to at least one end of the second electrode for positioning the second electrode coaxially with respect to the pipe segment. As a non-limiting example, a pair of radially-extending mounts may be respectively secured to opposed ends of the second electrode.

An electrical power source is electrically connected across the first and second electrodes to form a cylindrical capacitor and changes in capacitance of the cylindrical capacitor are monitored by a controller. Measured changes in the capacitance are representative of changes in the thickness of deposits accumulating on the internal surface of the pipe segment.

As a non-limiting example, the at least one valve may be a ball valve. In this non-limiting example, the at least one valve includes a spherical ball having a diameter substantially equal to an internal diameter of the pipe segment, with a diametrically extending passage formed through the spherical ball. When present, the spherical ball should form a fluid-tight seal with the interior wall of the pipe segment; however, the diameter of the spherical ball may be smaller than the diameter of the interior wall of the pipe segment by a negligible amount to allow the spherical ball to rotate within the pipe segment. In use, the spherical ball is selectively driven to rotate about an axis perpendicular to a central axis of the diametrically extending passage, with the spherical ball oriented such that the diametrically extending passage may be selectively oriented coaxially with the pipe segment.

The spherical ball may be driven to rotate manually or, alternatively, by a motor or the like. The motor or the like may be in electrical communication with the controller for receiving control signals therefrom. The controller may include a wireless transceiver for wirelessly communicating with a user device, allowing a user to remotely monitor the changes in deposit accumulation and also remotely control the opening and closing of the at least one valve.

In another non-limiting example, the at least one valve includes a housing mounted on the pipe segment with an interior of the housing in communication with the interior of the pipe segment. The at least one valve in this non-limiting example further includes a disc having a diameter substantially equal to an internal diameter of the pipe segment, where the disc is oriented such that a plane of the disc is perpendicular to an axis of the pipe segment. The disc may then be selectively moved between a closed position and an open position. The disc is fully received within the pipe segment in the closed position, and the disc is fully received within the housing in the open position. As a further non-limiting example, the housing may communicate with the interior of the pipe segment through a slit formed through the pipe segment, where the slit is sized and oriented to allow passage of the disc therethrough with minimal space for fluid leakage into the housing. The disc may be driven to move manually or, alternatively, by a linear actuator or the like. The linear actuator or the like may be in electrical communication with the controller for receiving control signals therefrom.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
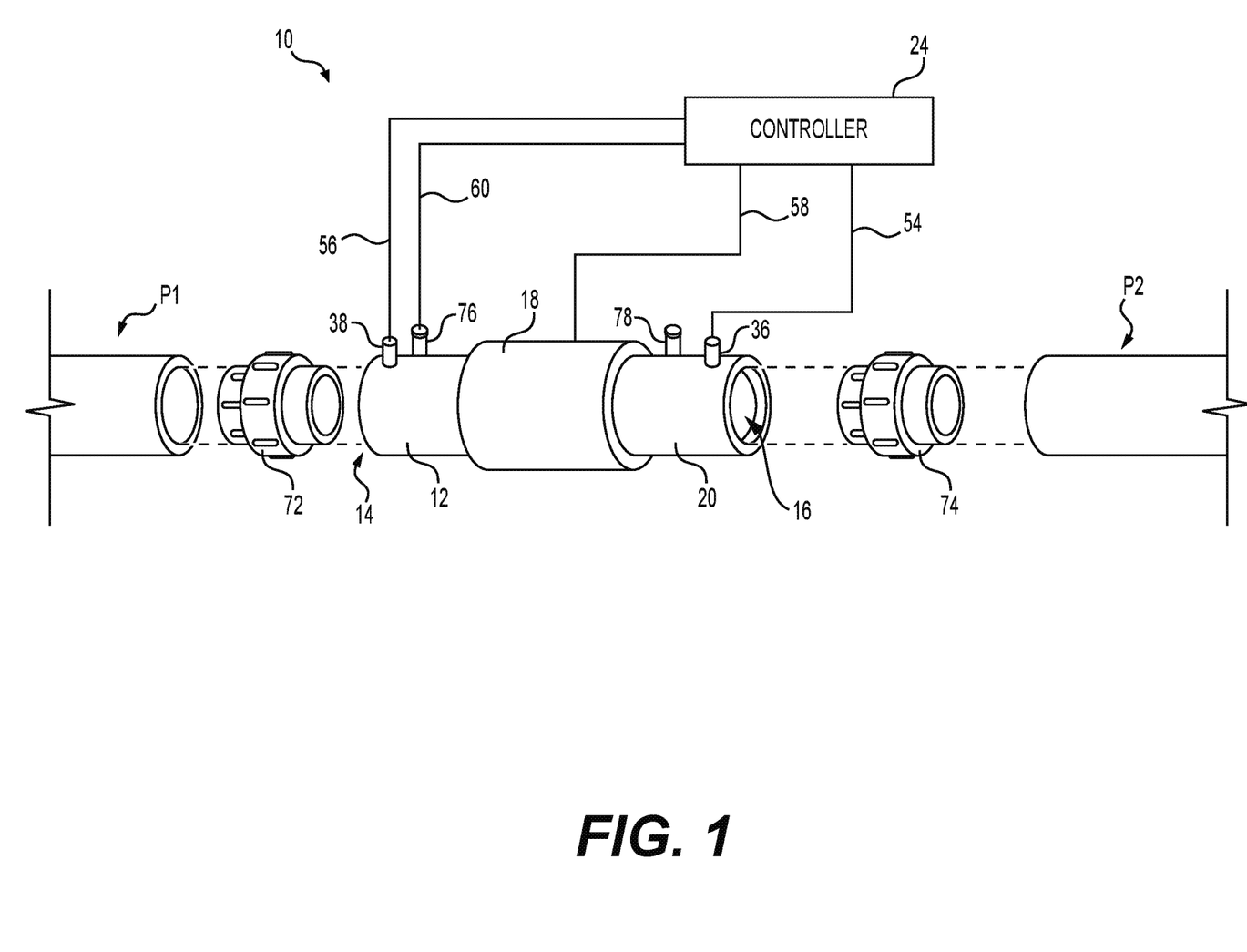
FIG. 1 is an environmental perspective view of a device for monitoring internal pipe deposit accumulation.
Figure 2:
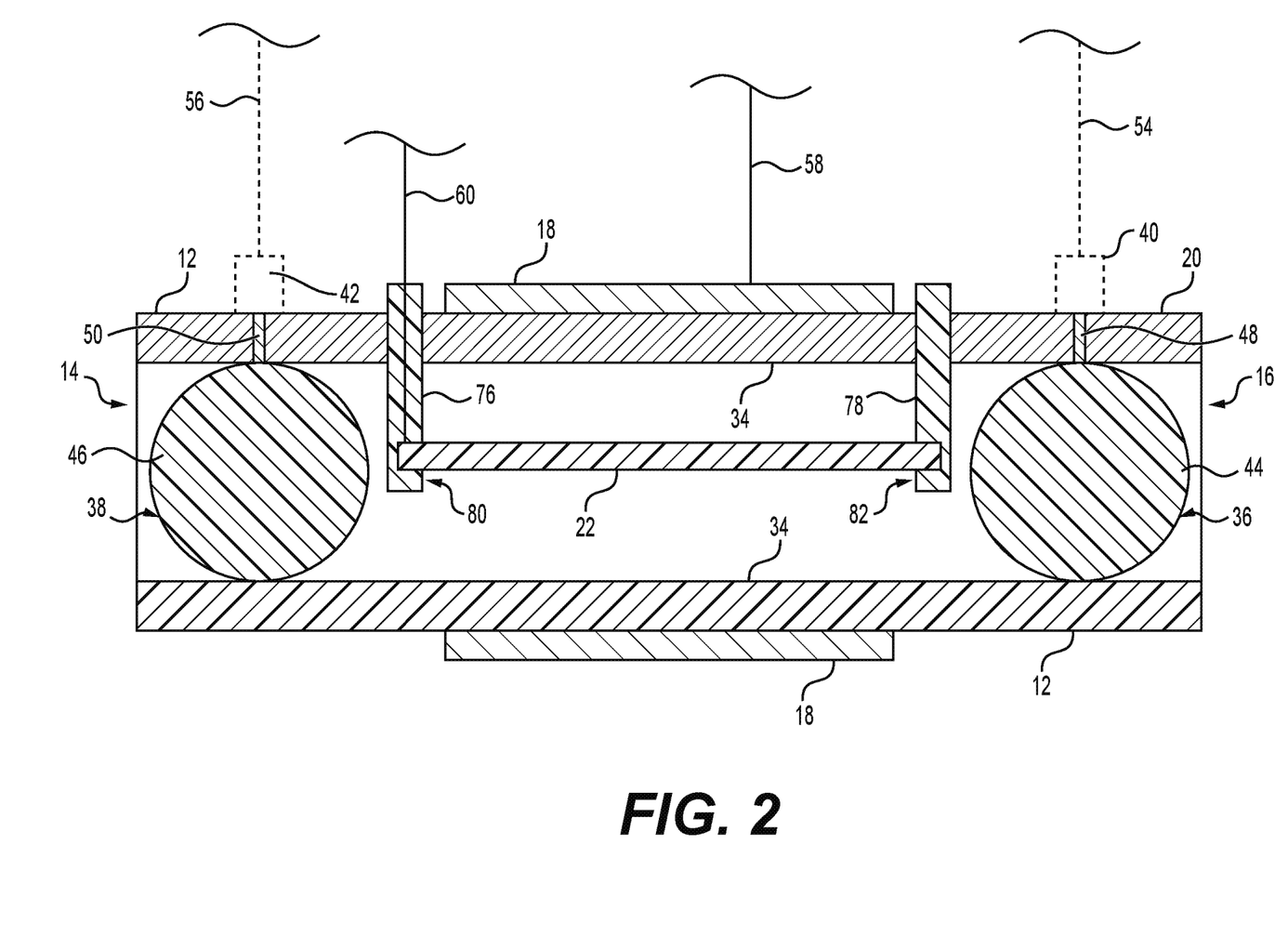
FIG. 2 is a side view in section of the device for monitoring internal pipe deposit accumulation.

The device for monitoring internal pipe deposit accumulation 10 is a capacitance-based sensor for monitoring changes in thickness of deposits accumulating on an internal surface of a pipe. As shown in FIGS. 1 and 2, the device for monitoring internal pipe deposit accumulation 10 includes a pipe segment 12 having opposed first and second open ends 14, 16, respectively, with at least one valve releasably sealing at least one of the first and second open ends 14, 16. In FIGS. 1 and 2, two valves 36, 38 are shown for sealing both ends of the pipe segment 12, however, it should be understood that only a single valve located at only one end of pipe segment 12 may be used. It should be further understood that the relative dimensions of pipe segment 12 are shown for exemplary purposes only. Additionally, it should be understood that pipe segment 12 may be made of any suitable type of waterproof and electrically insulating material, such as by way of non-limiting example polyvinyl chloride (PVC) or the like.

A first electrode 18, in the form of an electrically conductive cylindrical shell, is mounted on and surrounds a portion of an external surface 20 of the pipe segment 12. A second electrode 22, in the form of an electrically conductive rod, is mounted within an interior of the pipe segment 12, such that the second electrode 22 extends axially and is positioned coaxially with respect to the pipe segment 12. It should be understood that the relative dimensions of first and second electrodes 18, 22 are shown for exemplary purposes only; however, the first electrode 22, the second electrode 22 and pipe segment 12 should all be coaxially arranged with respect to one another. It should be understood that first and second electrodes 18, 22 may be made of any suitable type of electrically conductive material, such as by way of non-limiting example stainless steel, copper, aluminum or the like.

At least one mount may be secured to at least one end of the second electrode 22 for positioning the second electrode 22 coaxially with respect to the pipe segment 12. In the non-limiting example of FIG. 2, a pair of radially-extending mounts 76, 78 are respectively secured to opposed ends 80, 82 of the second electrode 22. It should be understood that any suitable type of electrically insulating mounting structure, and any suitable number of such mounting structures, may be used to hold the second electrode 22 in place such that the second electrode 22 extends along the central axis of both pipe segment 12 and the first electrode 18.

Figure 5:
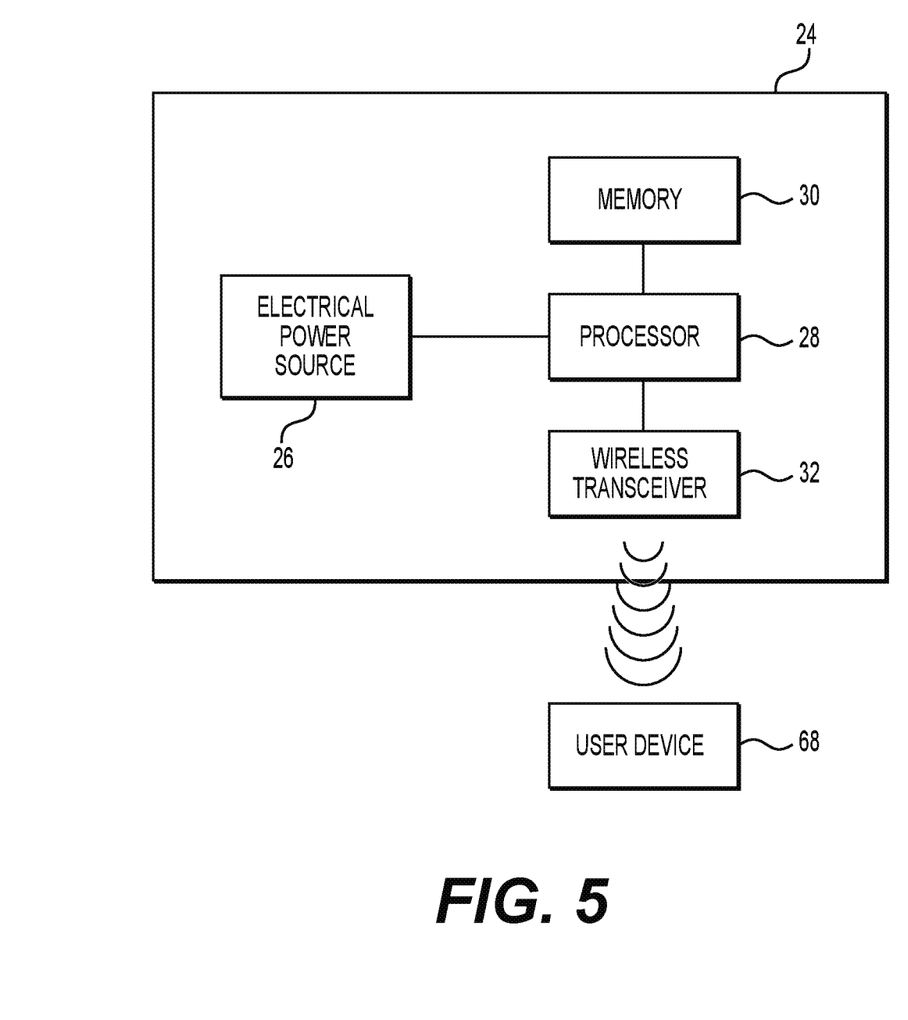
FIG. 5 is a block diagram illustrating components of a controller of the device for monitoring internal pipe deposit accumulation.

As shown in FIG. 5, an electrical power source 26 is further provided. Returning to FIGS. 1 and 2, the electrical power source 26 is electrically connected across the first and second electrodes 18, 22 by wires 58, 60, respectively, to form a cylindrical capacitor. It should be understood that wires 58, 60 are shown for exemplary purposes only and may be any suitable type of wire, cable or other type of electrically conductive line. Changes in capacitance of the cylindrical capacitor are monitored by a controller 24. Measured changes in the capacitance are representative of changes in the thickness of deposits accumulating on the internal surface of the pipe segment 12. In the non-limiting example of FIG. 2, wire 60 is carried by radially-extending mount 76 to contact end 80 of the second electrode 22. It should be understood that this arrangement is shown for exemplary purposes only and that wire 60 may charge the second electrode 22 via contact therewith at any suitable location.

It should be understood that controller 24 may be any suitable type of controller for controlling the charging of the first and second electrodes 18, 22 and measuring the capacitance therebetween. As shown in FIG. 5, controller 24 may include a processor 28 or the like, which may be any suitable type of processor, microprocessor or the like, which may either serve as a capacitance meter or which may be used in conjunction with a conventional capacitance meter. Controller 24 further includes a wireless transceiver 32 for transmitting capacitance and/or deposit accumulation data to an external user device 68, such as a smartphone, laptop computer or the like, and for receiving control signals from the user. Control programming, calibration data and the like may be stored in computer readable memory 30 in communication with processor 28. It should be understood that computer readable memory 30 may be any suitable type of non-transitory storage memory.

Figure 3A:
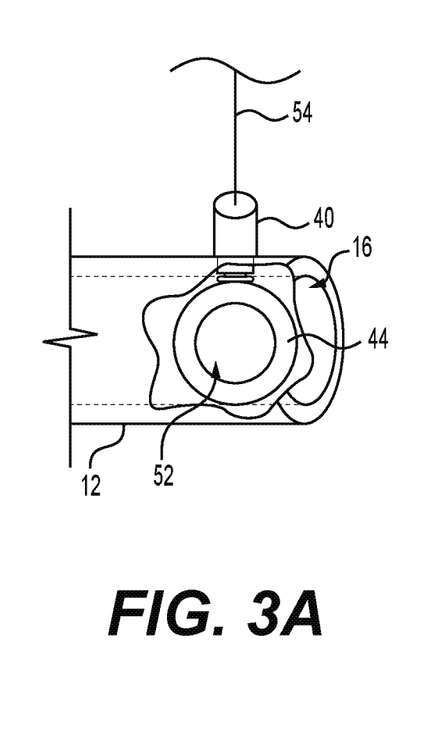
FIG. 3A is a partially cut-away, partial perspective view of the device for monitoring internal pipe deposit accumulation, showing a valve thereof in a closed position.
Figure 3B:
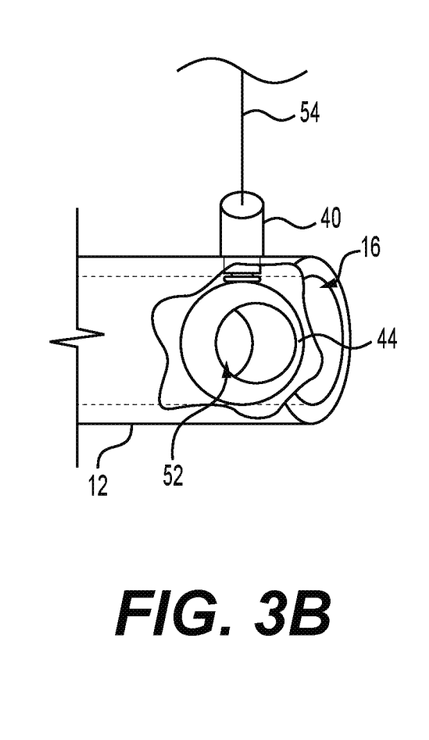
FIG. 3B is a partially cut-away, partial perspective view of the device for monitoring internal pipe deposit accumulation, showing the valve of FIG. 3A in an intermediate position.
Figure 3C:
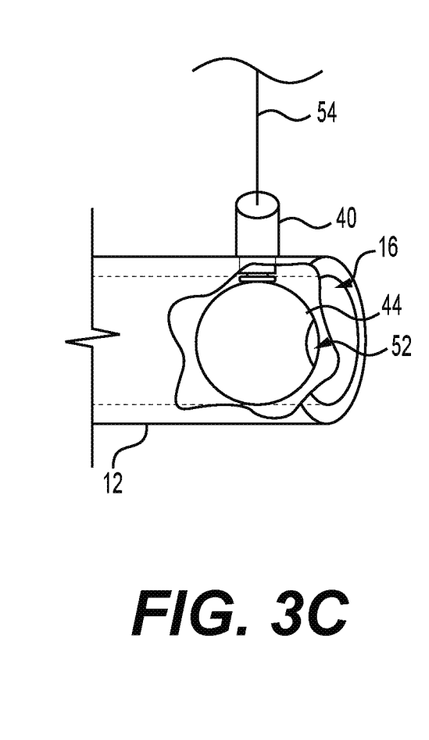
FIG. 3C is a partially cut-away, partial perspective view of the device for monitoring internal pipe deposit accumulation, showing the valve of FIG. 3A in a closed position.

In the non-limiting example of FIGS. 2 and 3A-3C, the valves are conventional ball valves. As shown in FIG. 2, valve 36 is provided to seal end 16 of pipe segment 12, and valve 38 is provided to seal end 14 of pipe segment 12. Valve 36 includes a spherical ball 44 having a diameter substantially equal to the internal diameter of the pipe segment 12. Similarly valve 38 includes an identical spherical ball 46. FIGS. 3A-3C show operation of only ball valve 36, however, it should be understood that ball valve 38 operates in an identical manner. In FIG. 3A, ball valve 36 is shown in a closed position, sealing end 16 of pipe segment 12. A diametrically extending passage 52 is formed through the spherical ball 44. In the position of FIG. 3A, both ends of passage 52 face the interior wall of pipe segment 12 and open end 16 is completely sealed by the remaining unbroken surface of spherical ball 44. The spherical ball 44 should form a fluid-tight seal with the interior wall of the pipe segment 12; however, the diameter of the spherical ball 44 may be smaller than the diameter of the interior wall of the pipe segment 12 by a negligible amount to allow the spherical ball 44 to rotate within the pipe segment 12. In use, the spherical ball 44 is selectively driven to rotate about an axis perpendicular to a central axis of the diametrically extending passage 42. In FIG. 3B, the spherical ball 44 is shown partially rotated before reaching the fully open position of FIG. 3C, where the diametrically extending passage 42 is oriented coaxially with the pipe segment 12, allowing fluid to flow freely through the diametrically extending passage 42 into and out of the pipe segment 12.

The spherical ball 44 may be driven to rotate manually or, alternatively, by a motor 40 or the like. The motor 40 or the like may be in electrical communication with the controller 24 (via line 54) for receiving control signals therefrom. The user may not only remotely monitor the changes in deposit accumulation via wireless transceiver 32, but may also remotely control the opening and closing of the valve 36. The valve 38 may be similarly controlled using a motor 42 or the like, which is also in communication with controller 24 through line 56. In FIG. 2, motors 40, 42 are shown driving spherical balls 44, 46 through respective connections with motor axles 48, 50. However, it should be understood that any suitable type of connection or coupling may be used, and that any suitable type of motor or other rotational drive may be used.

Returning to FIG. 1, in use, the device for monitoring internal pipe deposit accumulation 10 may be installed in an existing pipe or pipeline. In the non-limiting example of FIG. 1, an existing pipe is cut into two segments, P1, P2, and the device for monitoring internal pipe deposit accumulation 10 is connected therebetween using pipe fittings 72, 74, respectively. It should be understood that pipe fittings 72, 74 are shown for exemplary purposes only and that any suitable type of fittings, connectors, adapters or the like may be used. During installation, removal, and maintenance operations, the fluid flowing through the existing pipe is shut off and pipe segment 12 may be also be sealed using one or both of valves 36, 38.

Figure 4A:
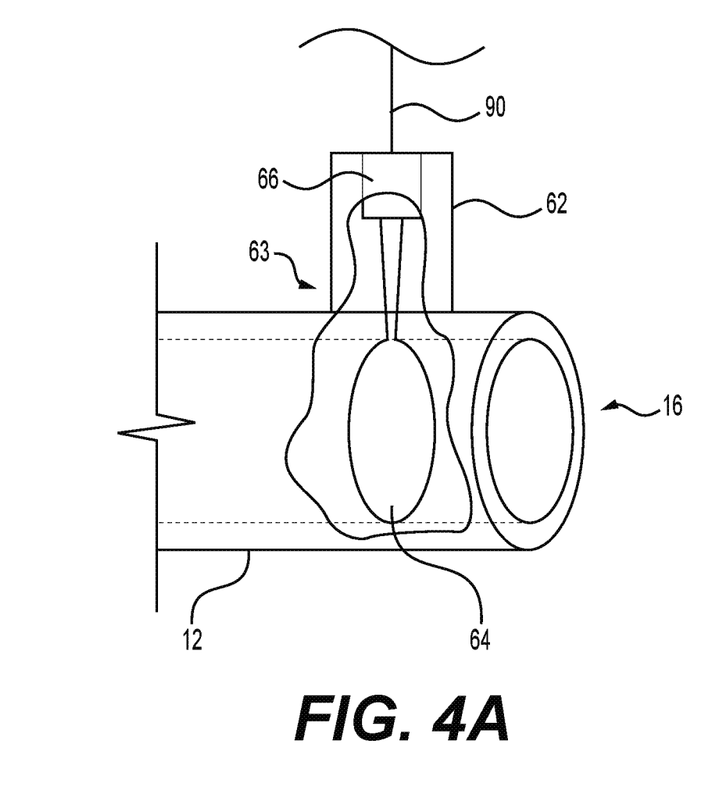
FIG. 4A is a partially cut-away, partial perspective view of the device for monitoring internal pipe deposit accumulation, showing an alternative embodiment of the valve in a closed position.
Figure 4B:
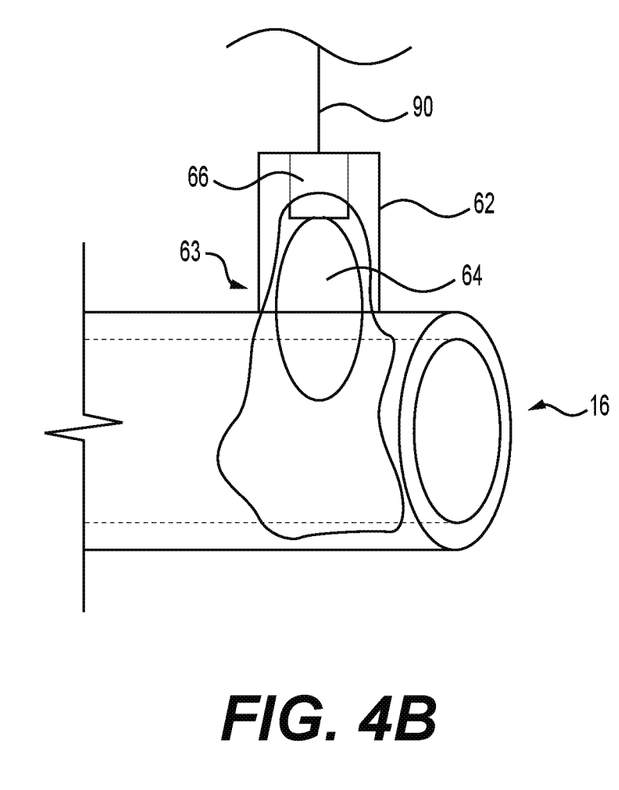
FIG. 4B is a partially cut-away, partial perspective view of the device for monitoring internal pipe deposit accumulation, showing the valve of FIG. 4A in an open position.

As noted above, any suitable type of valve(s) may be used. FIGS. 4A and 4B illustrate another non-limiting example in which the ball valves of FIGS. 2-3C are replaced by disc valves. Although FIGS. 4A and 4B only show a single disc valve 63 for sealing open end 16 of pipe segment 12, it should be understood that an identical disc valve may be provided for sealing the opposite end 14. In the non-limiting example of FIGS. 4A and 4B, disc valve 63 includes a housing 62 mounted on the pipe segment 12, adjacent to open end 16, with an interior of the housing 62 in communication with the interior of the pipe segment 12. The disc valve 63 in this non-limiting example further includes a disc 64 having a diameter substantially equal to an internal diameter of the pipe segment 12, where the disc is oriented such that a plane of the disc 64 is perpendicular to the central axis of the pipe segment 12. The disc 64 may then be selectively moved between a closed position (shown in FIG. 4A) and an open position (shown in FIG. 4B). The disc 64 is fully received within the pipe segment 12 in the closed position, as shown in FIG. 4A, and the disc 64 is fully received within the housing 62 in the open position, as shown in FIG. 4B.

As a further non-limiting example, the housing 62 may communicate with the interior of the pipe segment 12 through a slit formed through the pipe segment 12, where the slit is sized and oriented to allow passage of the disc 64 therethrough with minimal space for fluid leakage into the housing 62. The disc 64 may be driven to move manually or, alternatively, by a linear actuator 66 or the like. The linear actuator 66 or the like may be in electrical communication with the controller 24 via line 90 for receiving control signals therefrom.

It is to be understood that the device for monitoring internal pipe deposit accumulation is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A device for monitoring internal pipe deposit accumulation, comprising:
    a pipe segment having opposed first and second open ends;
    at least one valve releasably sealing at least one of the first and second open ends of the pipe segment;
    a first electrode comprising an electrically conductive cylindrical shell mounted on and surrounding a portion of an external surface of the pipe segment;
    a second electrode comprising an electrically conductive rod mounted within an interior of the pipe segment, the second electrode extending axially and being positioned coaxially with respect to the pipe segment;
    an electrical power source electrically connected across the first and second electrodes to form a cylindrical capacitor; and
    means for monitoring changes in capacitance of the cylindrical capacitor, whereby changes in the capacitance are representative of changes in a thickness of a deposit accumulating on an internal surface of the pipe segment.

2. The device for monitoring internal pipe deposit accumulation as recited in claim 1, wherein the at least one valve comprises:
    a spherical ball having a diameter substantially equal to an internal diameter of the pipe segment, said spherical ball having a diametrically extending passage formed therethrough; and
    means for selectively driving rotation of said spherical ball about an axis perpendicular to a central axis of the diametrically extending passage, wherein the spherical ball is oriented such that the diametrically extending passage may be selectively oriented coaxially with the pipe segment.

3. The device for monitoring internal pipe deposit accumulation as recited in claim 2, wherein said means for selectively driving rotation of said spherical ball comprises a motor.

4. The device for monitoring internal pipe deposit accumulation as recited in claim 3, further comprising a controller, wherein said controller comprises said means for monitoring changes in the capacitance of the cylindrical capacitor and is further in electrical communication with the motor for transmitting control signals thereto.

5. The device for monitoring internal pipe deposit accumulation as recited in claim 4, wherein said controller further comprises a wireless transceiver for wirelessly communicating with a user device.

6. The device for monitoring internal pipe deposit accumulation as recited in claim 1, wherein the at least one valve comprises:
    a housing mounted on the pipe segment, wherein an interior of the housing is in communication with the interior of the pipe segment;
    a disc having a diameter substantially equal to an internal diameter of the pipe segment, said disc being oriented such that a plane of the disc is perpendicular to an axis of the pipe segment; and
    means for selectively moving the disc between a closed position and an open position, wherein the disc is fully received within the pipe segment in the closed position, and wherein the disc is fully received within the housing in the open position.

7. The device for monitoring internal pipe deposit accumulation as recited in claim 6, wherein said means for selectively driving rotation of said spherical ball comprises a linear actuator.

8. The device for monitoring internal pipe deposit accumulation as recited in claim 7, further comprising a controller, wherein said controller comprises said means for monitoring changes in the capacitance of the cylindrical capacitor and is further in electrical communication with the linear actuator for transmitting control signals thereto.

9. The device for monitoring internal pipe deposit accumulation as recited in claim 8, wherein said controller further comprises a wireless transceiver for wirelessly communicating with a user device.

10. The device for monitoring internal pipe deposit accumulation as recited in claim 1, further comprising at least one mount secured to at least one end of the second electrode for positioning the second electrode coaxially with respect to the pipe segment.

11. The device for monitoring internal pipe deposit accumulation as recited in claim 10, wherein the at least one mount comprises a pair of radially-extending mounts respectively secured to opposed ends of the second electrode.

12. A device for monitoring internal pipe deposit accumulation, comprising:
- a pipe segment having opposed first and second open ends;
- at least one valve releasably sealing at least one of the first and second open ends of the pipe segment;
- a first electrode comprising an electrically conductive cylindrical shell mounted on and surrounding a portion of an external surface of the pipe segment;
- a second electrode comprising an electrically conductive rod mounted within an interior of the pipe segment, the second electrode extending axially and being positioned coaxially with respect to the pipe segment;
- at least one mount secured to at least one end of the second electrode for positioning the second electrode coaxially with respect to the pipe segment;
- an electrical power source electrically connected across the first and second electrodes to form a cylindrical capacitor; and
- means for monitoring changes in capacitance of the cylindrical capacitor, whereby changes in the capacitance are representative of changes in a thickness of a deposit accumulating on an internal surface of the pipe segment.

13. The device for monitoring internal pipe deposit accumulation as recited in claim 12, wherein the at least one valve comprises:
- a spherical ball having a diameter substantially equal to an internal diameter of the pipe segment, said spherical ball having a diametrically extending passage formed therethrough; and
- means for selectively driving rotation of said spherical ball about an axis perpendicular to a central axis of the diametrically extending passage, wherein the spherical ball is oriented such that the diametrically extending passage may be selectively oriented coaxially with the pipe segment.

14. The device for monitoring internal pipe deposit accumulation as recited in claim 13, wherein said means for selectively driving rotation of said spherical ball comprises a motor.

15. The device for monitoring internal pipe deposit accumulation as recited in claim 14, further comprising a controller, wherein said controller comprises said means for monitoring changes in the capacitance of the cylindrical capacitor and is further in electrical communication with the motor for transmitting control signals thereto.

16. The device for monitoring internal pipe deposit accumulation as recited in claim 15, wherein said controller further comprises a wireless transceiver for wirelessly communicating with a user device.

17. The device for monitoring internal pipe deposit accumulation as recited in claim 12, wherein the at least one valve comprises:
- a housing mounted on the pipe segment, wherein an interior of the housing is in communication with the interior of the pipe segment;
- a disc having a diameter substantially equal to an internal diameter of the pipe segment, said disc being oriented such that a plane of the disc is perpendicular to an axis of the pipe segment; and
- means for selectively moving the disc between a closed position and an open position, wherein the disc is fully received within the pipe segment in the closed position, and wherein the disc is fully received within the housing in the open position.

18. The device for monitoring internal pipe deposit accumulation as recited in claim 17, wherein said means for selectively driving rotation of said spherical ball comprises a linear actuator.

19. The device for monitoring internal pipe deposit accumulation as recited in claim 18, further comprising a controller, wherein said controller comprises said means for monitoring changes in the capacitance of the cylindrical capacitor and is further in electrical communication with the linear actuator for transmitting control signals thereto.

20. The device for monitoring internal pipe deposit accumulation as recited in claim 19, wherein said controller further comprises a wireless transceiver for wirelessly communicating with a user device.

* * * * *